UNITED STATES PATENT OFFICE.

EDWARD T. HURLEY, OF CINCINNATI, OHIO.

CRAYON.

1,414,570.  Specification of Letters Patent.  Patented May 2, 1922.

No Drawing.  Application filed March 17, 1920.  Serial No. 366,487.

*To all whom it may concern:*

Be it known that I, EDWARD T. HURLEY, a citizen of the United States of America, and a resident of Cincinnati, in the county of Hamilton and State of Ohio, have invented a new and useful Improvement in Crayons, of which the following is a specification.

The object of my invention is to provide a crayon that will not dry out or become hard with time. Another object is to provide a crayon that will at all times have a uniform consistency whereby it will be possible to repeatedly draw crayons over applied crayon without cutting away any applied crayon. Another object is to provide a crayon that will not rub or crack off.

These objects are attained by the crayon resulting from the following process:—

Melt and mix together one quart paraffin, one quart animal fat, preferably mutton tallow, two ounces turpentine. To this add the pigment and then pour into molds to cool.

The fundamental idea of my disclosure is the avoiding the use of vegetable oil and wax in the composition, for the reason that such oils and waxes become dry and hard with time. This crayon compound constitutes a grease paint and is a substitute for pastel crayons and has the added advantage that it will not rub off.

What I claim is:—

1. A crayon consisting of animal fat, paraffin, turpentine and pigment.

2. A crayon consisting of mutton tallow, paraffin, turpentine and pigment.

3. A crayon comprising grease, paraffin and pigment.

In witness whereof, I have hereunto subscribed my name this 13th day of March, 1920.

EDWARD T. HURLEY.